US007824614B2

(12) United States Patent
Tanaami

(10) Patent No.: US 7,824,614 B2

(45) Date of Patent: Nov. 2, 2010

(54) CARTRIDGE FOR CHEMICAL REACTION AND CHEMICAL REACTION PROCESSING SYSTEM

(75) Inventor: Takeo Tanaami, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 344 days.

(21) Appl. No.: 11/487,471

(22) Filed: Jul. 17, 2006

(65) Prior Publication Data

US 2007/0014698 A1 Jan. 18, 2007

(30) Foreign Application Priority Data

Jul. 15, 2005 (JP) ........................ P. 2005-206353

(51) Int. Cl.
*G01N 21/00* (2006.01)
*B01J 19/00* (2006.01)
*B01L 3/02* (2006.01)

(52) U.S. Cl. ........................ 422/63; 422/68.1; 422/100; 422/102; 422/106; 422/108; 422/236; 436/180

(58) Field of Classification Search .................. 422/63, 422/68.1, 100, 102, 106, 108, 236; 436/180
See application file for complete search history.

(56) References Cited

U.S. PATENT DOCUMENTS 7,201,881 B2 * 4/2007 Cox et al. .................. 422/100
2004/0137607 A1 7/2004 Tanaami et al.
2004/0151629 A1 * 8/2004 Pease et al. ............... 422/68.1
2004/0254559 A1 12/2004 Tanaami et al.
2005/0244308 A1 * 11/2005 Tanaami et al. ............ 422/180

FOREIGN PATENT DOCUMENTS

EP 1 508 368 A1 2/2005
JP 3166144 B2 3/2001
JP 2005-37368 A 2/2005
WO 01/07892 A1 2/2001

* cited by examiner

*Primary Examiner*—Walter D Griffin
*Assistant Examiner*—Lessanework Seifu
(74) *Attorney, Agent, or Firm*—Sughrue Mion, PLLC

(57) ABSTRACT

In a cartridge for chemical reaction, there are provided an inner part in which a chemical reaction is caused by feeding a liquid in accordance with a deformation when an external force is applied, and a plurality of passages that are connected with each other, and the passages can be switched between an opened state and a closed state by the external force. Since the plurality of passages are connected together in the cartridge, the cartridge can be applied to various uses. The plurality of passages may be connected together in the form of a network. Wells may be provided at the junctions of the passages. When the external force is applied on the well, the liquid may be pushed out of the well through the passages connected to the well. A passage may be provided for introducing a sample into the cartridge from an external part of the cartridge.

12 Claims, 6 Drawing Sheets

CARTRIDGE FOR CHEMICAL REACTION AND CHEMICAL REACTION PROCESSING SYSTEM

This application claims foreign priority based on Japanese Patent Application No. 2005-206353, filed Jul. 15, 2005, the content of which is incorporated herein by reference in its entirety.

BACKGROUND OF THE INVENTION

1. Field of the Invention

The present invention relates to a cartridge for a chemical reaction that generates a chemical reaction by feeding liquid in an inner part in accordance with a deformation caused by an external force, and a chemical reaction processing system for handling the cartridge for a chemical reaction.

2. Description of the Related Art

A cartridge for a chemical reaction that generates a chemical reaction by feeding liquid in an inner part in accordance with a deformation when an external force is applied on the cartridge is known (refer to JP-A-2005-37368). Further, a general-purpose experimental system is known in which liquid droplets are moved on a wafer by Coulomb forces or electrophoresis (refer to Japanese Patent No. 3166144).

In the above-described general-purpose experimental system, the liquid droplets are moved in accordance with a prescribed procedure so that a desired experiment can be carried out. However, since the liquid droplets are exposed to outside air while being on the wafer, the evaporation of the liquid droplets cannot be avoided. Further, there is a problem that various kinds of processes are difficult, such as mixing a plurality of kinds of liquid droplets, heating the liquid droplets, or applying pressure to the liquid droplets.

SUMMARY OF THE INVENTION

The present invention has been made in view of the above circumstances, and provides a cartridge for a chemical reaction and a chemical reaction processing system in which generalized and various processes can be carried out by feeding the liquid in accordance with a deformation when the external force is applied on the cartridge.

In some implementations, a cartridge of the invention which causes a chemical reaction by feeding liquid in an inner part of the cartridge by deformation when an external force is applied, the cartridge comprising:

a substrate;

an elastic member which is overlaid on the substrate;

a plurality of passages which are provided by said elastic member, wherein a plurality of passages are connected with each other in the inner part of the cartridge, and the passages are switched between an opened state and a closed state respectively by the external force.

According to the cartridge for a chemical reaction, since the plurality of passages are connected with each other in the inner part of the cartridge and the passages are switched between an opened state and a closed state respectively by the external force, the cartridge can be applied to various purposes.

The cartridge may further comprise a plurality of junctions, each of said junctions connecting at least two of the plurality of passages.

The cartridge may further comprise a well provided at each junction.

In the cartridge of the invention, when the external force is applied on the well, the liquid in the well is fed by being pushed out of the well through the passages connected to the well.

The cartridge of the invention may further comprise: an introducing passage for introducing a sample into the inner part of the cartridge from an outside of the cartridge.

The cartridge of the invention may further comprise:

a discharge passage for discharging the liquid to an outside of the cartridge by the external force.

In some implementations, a chemical reaction processing system of the invention which handles a cartridge for a chemical reaction comprises:

a first actuator for applying a first external force to the cartridge so as to switch a plurality of passages formed in an inner part of the cartridge between an opened state and a closed state respectively, wherein the passages are connected with each other in the inner part of the cartridge, and the chemical reaction is caused in the cartridge by feeding liquid in the inner part of the cartridge by deformation when an external force including the first external force is applied.

According to the chemical reaction processing system, since the actuators are provided for applying the external force to the cartridge to switch the opened and closed states of the individual passages, the cartridge can be applied to various purposes.

In the chemical reaction processing system of the invention, the cartridge includes a plurality of junctions, each of said junctions connecting at least two of the plurality of passages.

In the chemical reaction processing system of the invention, the cartridge includes a well at each junction, and the chemical reaction processing system further comprising:

a second actuator for applying a second external force as the external force to the cartridge so that the liquid in the well is fed by being pushed out of the well through the passages connected to the well.

The chemical reaction processing system of the invention further comprises:

a storing section for storing operation procedures of the first actuator and the second actuator; and an actuator control section for operating the first actuator and the second actuator in accordance with the stored operation procedures.

In this case, since the actuators are operated in accordance with the stored operation procedure, the actuators can be easily operated even if the procedure is complicated.

The chemical reaction processing system of the invention further comprises:

a detecting section for detecting a state of the cartridge; and a state control section for controlling the state of the cartridge in accordance with a result of the detection by the detecting section.

According to the cartridge of the invention for a chemical reaction, since the plurality of passages are connected with each other in the inner part of the cartridge and the passages are switched between an opened state and a closed state respectively by the external force, the cartridge can be applied to various purposes.

According to the chemical reaction processing system of the present invention, since the actuators are provided for applying the external force to the cartridge to switch the opened and closed states of the individual passages, the cartridge can be applied to various purposes.

DESCRIPTION OF THE PREFERRED EMBODIMENTS

Now, an embodiment of a cartridge for a chemical reaction according to the present invention will be described below by referring to FIGS. 1A to 6.

Figure 1A:
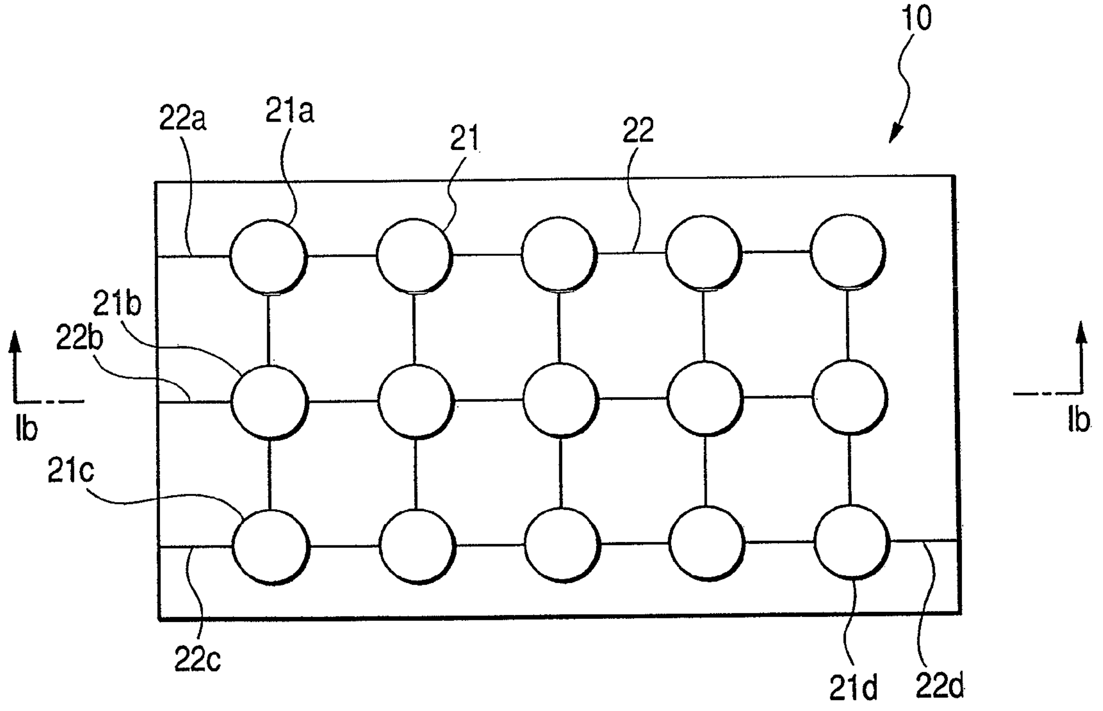
FIG. 1A is a diagram showing the structure of a cartridge for a chemical reaction of an embodiment, and a plan view showing the cartridge.
Figure 1B:
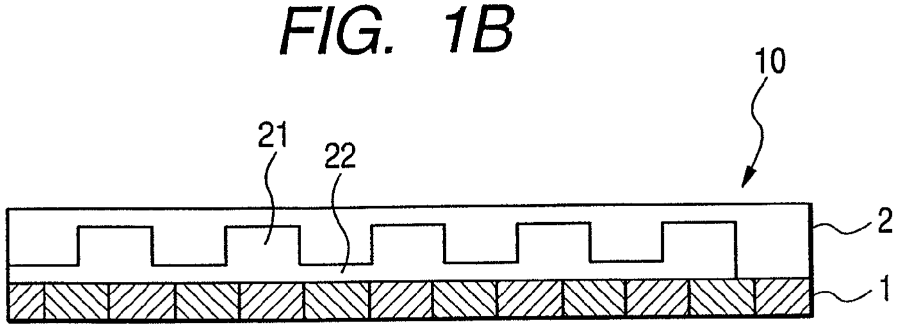
FIG. 1B is a diagram showing the structure of a cartridge for a chemical reaction of an embodiment, and a sectional view taken along the line Ib-Ib of FIG. 1A.

FIG. 1A is a plan view showing a cartridge for a chemical reaction of the preferred embodiment, and FIG. 1B is a sectional view taken along a line Ib-Ib of FIG. 1A.

As shown in FIGS. 1A and 1B, a cartridge 10 for a chemical reaction of the preferred embodiment includes a substrate 1 and an elastic member 2 overlaid on the substrate 1.

On the back surface of the elastic member 2 (the bottom side in FIG. 1B), recessed parts of prescribed shapes are formed that are recessed towards the front surface side (the top side in FIG. 1B). The recessed parts form spaces between the cartridge substrate 1 and the elastic member 2 to form wells 21 arranged in the form of a matrix and passages 22 for connecting the adjacent wells 21 together.

In the area excluding the recessed parts, the substrate 1 is bonded to the elastic member 2. Accordingly, solution contained in the recessed parts can be sealed in the cartridge to prevent the solution from leaking outside. Further, there is no fear that the solution in the cartridge will evaporate.

A passage 22*a* connected to a well 21*a* communicates with an external part through a side surface of the cartridge 10, and functions as an introducing passage for introducing a sample to the well 21*a*. Passage 22*b* which is connected to well 21*b* and passage 22*c* which is connected to well 21*c* likewise communicate with external parts and serve as introducing passages.

Further, passage 22*d* which is connected to well 21*d* communicates with an external part through a side surface of cartridge 10 to function as a discharge passage for discharging the solution in well 21*d*.

Figure 2:
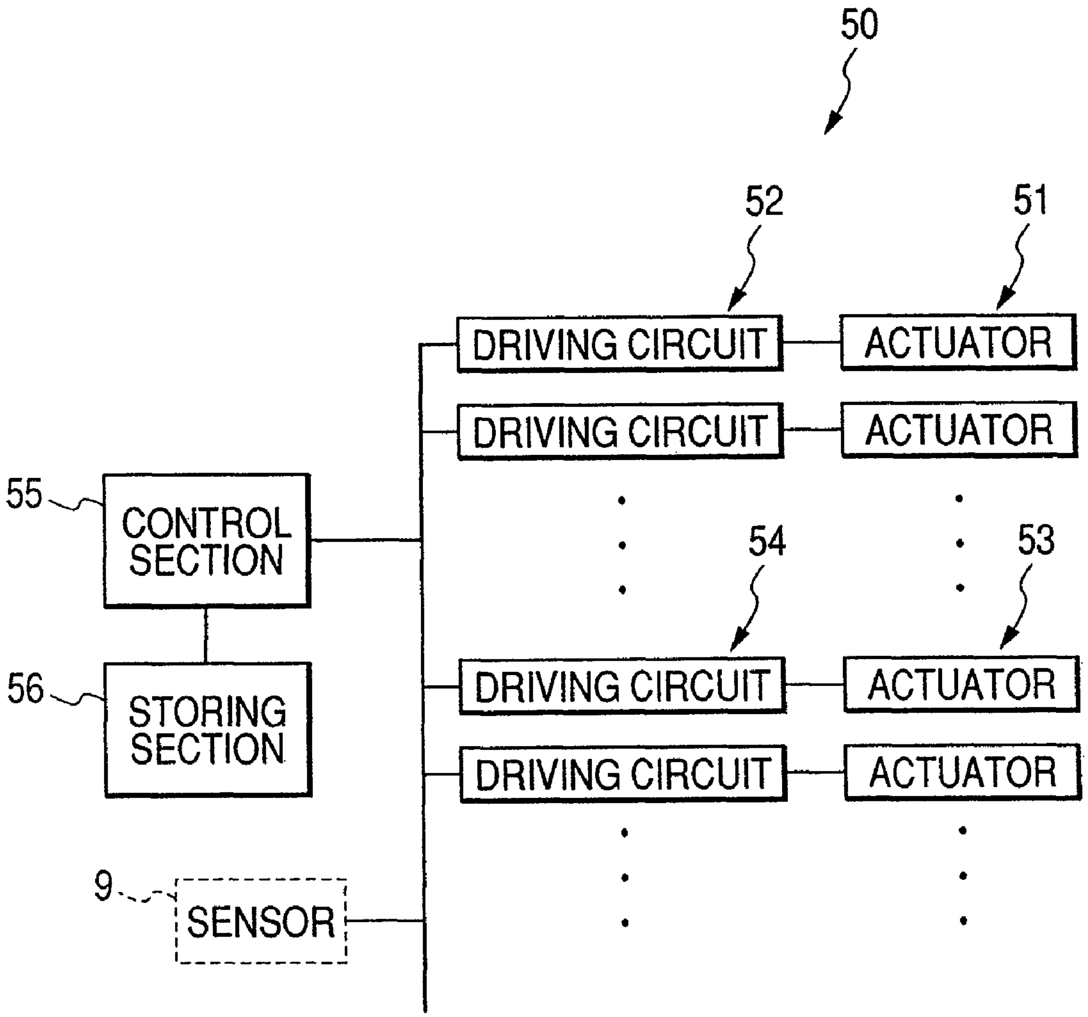
FIG. 2 is a block diagram showing a structure of a chemical reaction processing system.

FIG. 2 is a block diagram showing the structure of a chemical reaction processing system 50 used by combining the system with the cartridge 10.

As shown in FIG. 2, the chemical reaction processing system 50 includes a plurality of actuators 51, another plurality of actuators 53, a plurality of driving circuits 52 for independently driving the plurality of actuators 51 respectively, a plurality of driving circuits 54 for independently driving the other plurality of actuators 53 respectively, a control section 55 for controlling driving circuits 52 and driving circuits 54, and a storing section 56 for storing a program or data.

Figure 3A:
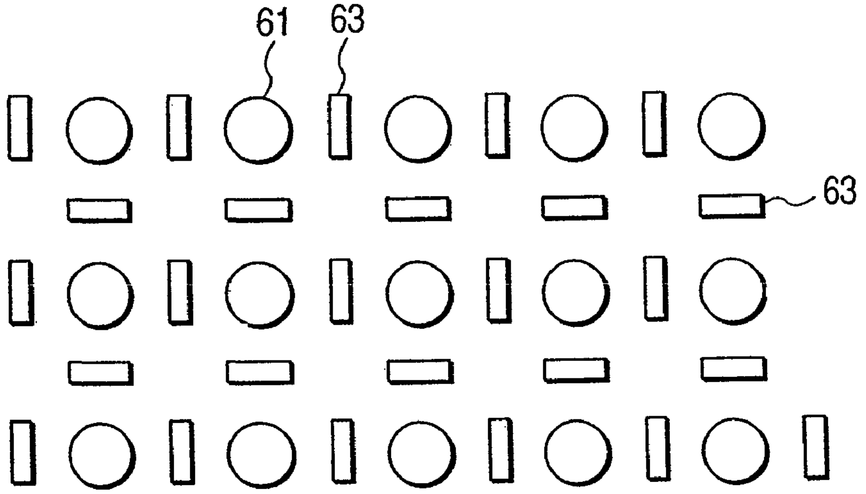
FIG. 3A is a diagram showing the arrangement of control members driven by actuators.
Figure 3B:
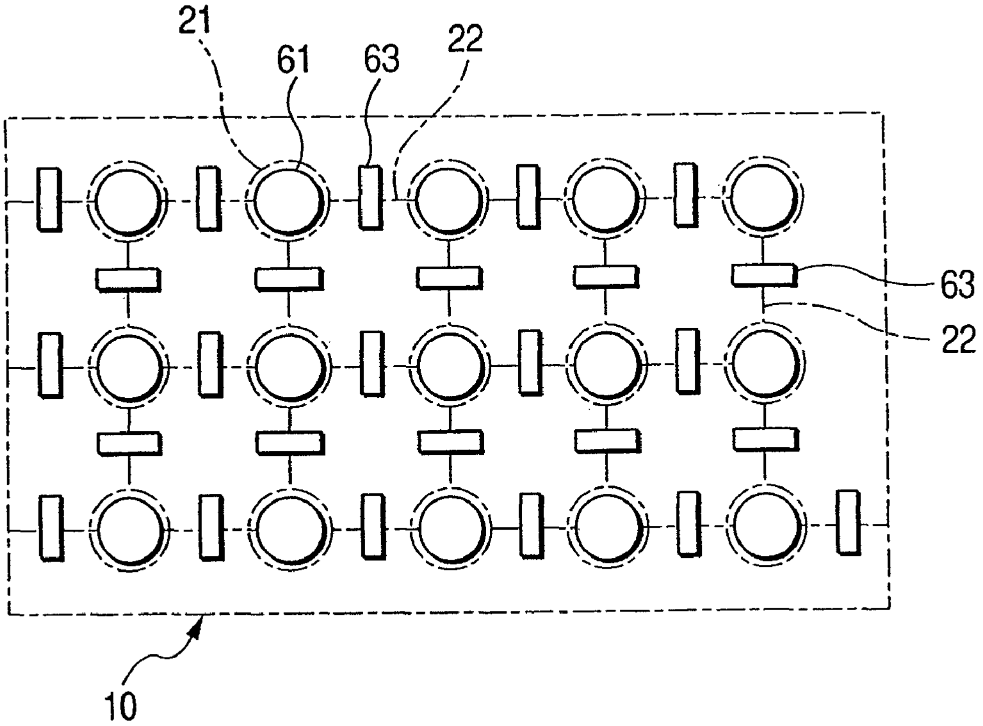
FIG. 3B is a diagram showing the arrangement of control members driven by actuators, and shows the positional relationship between the cartridge and the control members.

FIGS. 3A and 3B are diagrams showing the arrangement of control members driven by actuators 51 and actuators 53. FIG. 3A shows the arrangement of the control members and FIG. 3B shows a positional relationship between the cartridge 10 and the control members, respectively.

As shown in FIGS. 3A and 3B, the well control members 61 driven by the actuators 51 are arranged at positions corresponding to wells 21 of the cartridge 10 in a matrix form. The passage control members 63 driven by actuators 53 are arranged at positions corresponding to passages 22 of the cartridge 10. As shown in FIG. 3B, the passage control member 63 is arranged in a direction in which the longitudinal direction of the passage control member 63 intersects at right angles with the corresponding passage 22.

Now, the operation of the chemical reaction processing system 50 will be described below.

Figure 4A:
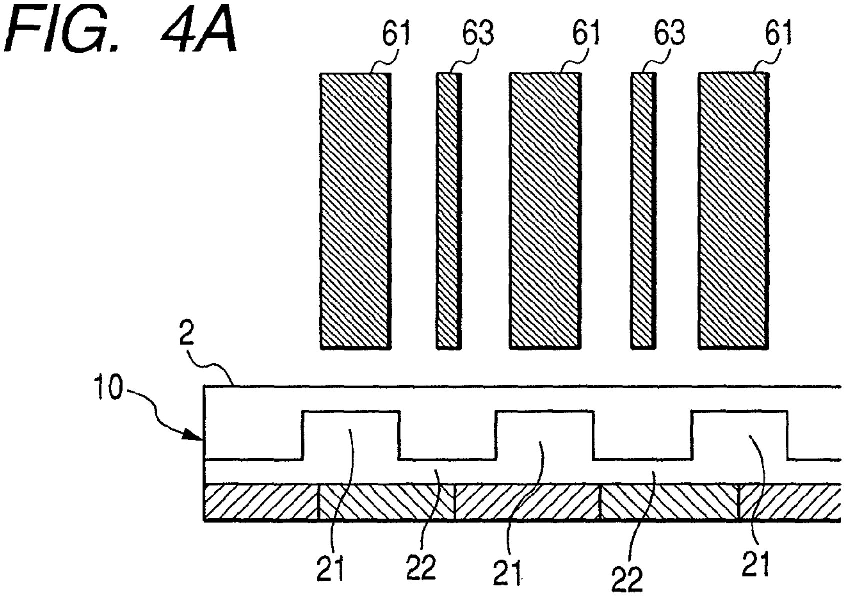
FIGS. 4A to 4C are sectional views of the cartridge showing functions of control members.

When the cartridge 10 is mounted on a prescribed part of chemical reaction processing system 50, the positional relationship shown in FIG. 3B is ensured. At this time, as shown in FIG. 4A, the well control members 61 are positioned over wells 21 and passage control members 63 are positioned over passages 22, respectively.

Figure 4B:
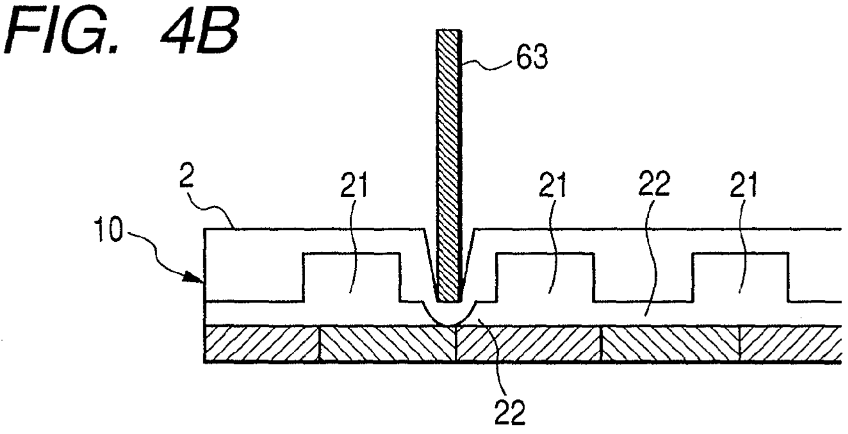

As shown in FIG. 4B, when passage control member 63 is driven downward by the corresponding actuator 53, the passage control member 63 collapses the corresponding passage 22 so that passage 22 is closed. When passage control member 63 is returned upward, the form of passage 22 is restored by the restoring force of elastic member 2 to open passage 22. In such a way, passage 22 functions as a valve.

Figure 4C:
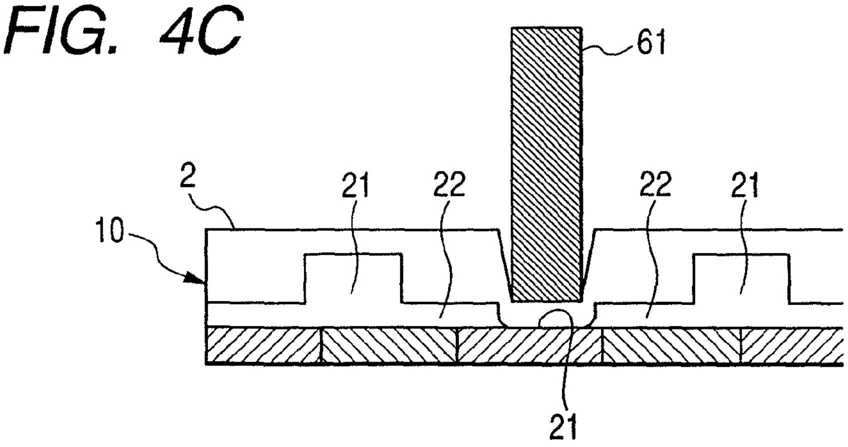

As shown in FIG. 4C, when well control member 61 is driven downward by the corresponding actuator 51, well control member 61 collapses the corresponding well 21. When well control member 61 is returned upward, the form of well 21 is restored by the restoring force of elastic member 2.

In the chemical reaction processing system 50, well control members 61 and passage control members 63 are driven in accordance with a prescribed procedure, so that the opening and closing operations of passages 22 and the states of wells 22 can be independently controlled and various operations can be performed.

FIGS. 5A-5D show example operations using the cartridge 10.

Figure 5A:
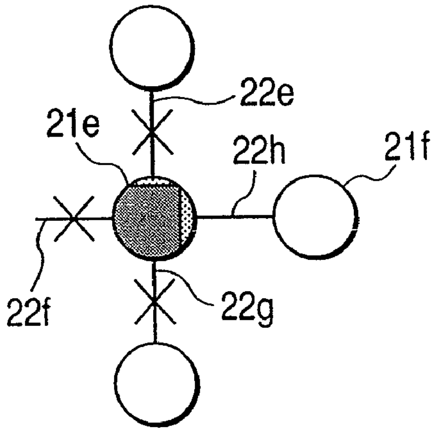
FIGS. 5A to 5D show examples of procedures of operations using the cartridge.

FIG. 5A shows a state where passage 22*e*, passage 22*f*, and passage 22*g* are closed and passage 22*h* is opened, and well 21*e* is collapsed. Thus, the solution is fed to well 21*f* from well 21*e* through passage 22*h*.

Figure 5B:
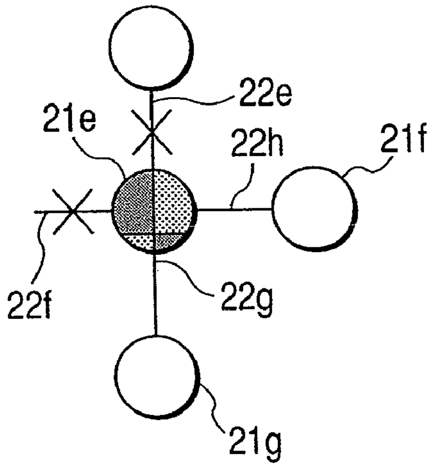

FIG. 5B shows a state where passage 22*e* and passage 22*f* are closed, and passage 22*g*and passage 22*h*are opened, and well 21*e* is being collapsed. Thus, the solution is fed in the two directions of well 21*f* and well 21*g* from well 21*e* through passage 22*g* and passage 22*h*.

Figure 5C:
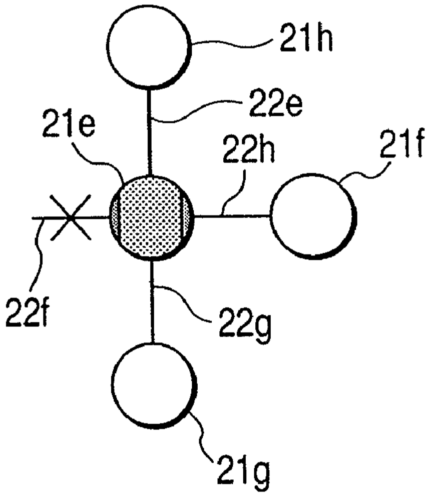

FIG. 5C shows a state where passage 22*f* is closed and passage 22*e*, passage 22*g* and passage 22*h* are opened, and well 21*e* is being collapsed. Thus, the solution is fed in the three directions of well 21*f*, well 21*g* and well 21*h* from well 21*e* through passage 22*e*, passage 22*g*and passage 22*h*.

Figure 5D:
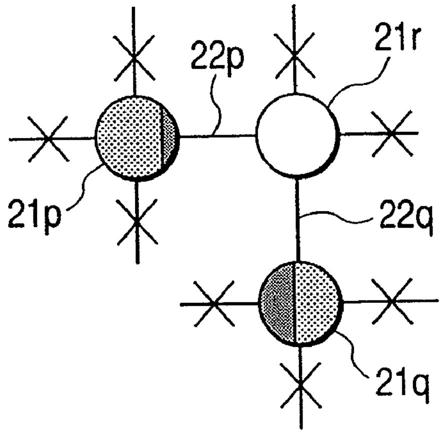

FIG. 5D shows a state where only passage 22*p* and passage 22*q* are opened, and well 21*p* and well 21*q* are being collapsed at the same time. Thus, the solution in well 21*p* and the solution in well 21*q* are fed to well 21*r* and the solution from both wells is mixed together in well 21*r*.

In the preferred embodiment, well control members 61 and passage control members 63 are controlled by a computer in accordance with the program stored in the storing section 56 to sequentially perform prescribed operations. Accordingly, a complicated procedure including many operations can be easily performed. The procedure of the operations can be freely designed by a user through the program or the data. Consequently, the cartridge 10 can be used for an arbitrary purpose and the chemical reaction processing system 50 is suitable for a general purpose system for an experiment. When the user injects a prescribed reagent into the cartridge to perform a prescribed program, a desired operation procedure is automatically performed.

The type of a chemical reaction is not limited to a specific chemical reaction. For instance, the chemical reaction may be carried out to detect various kinds of materials or may be carried out for the purpose of producing a prescribed product, for instance, an epoxy resin. A detecting chip for detecting a prescribed material may be incorporated in the cartridge. In this case, the detecting chip is incorporated in the cartridge and light or an electric field may be applied to the cartridge to perform various kinds of pre-processes or detection.

The discharge passage may be omitted depending on the purpose of the cartridge. Since the cartridge can be discarded while the sealing state of the cartridge is maintained, safety can be ensured. When the cartridge is formed with a material that can be burned (for instance, PDMS or polydimethylsiloxane), risk of viral infection can be avoided.

In the above-described embodiment, the control member is pressed against the cartridge from one direction. However, the control members may be pressed against the cartridge from both sides. Further, one well may be divided into a plurality of areas and the control members may be respectively allocated to the areas. In this case, the driving timings of the control members are shifted in a solution supplying direction, so that the solution can be smoothly and accurately supplied.

Figure 6:
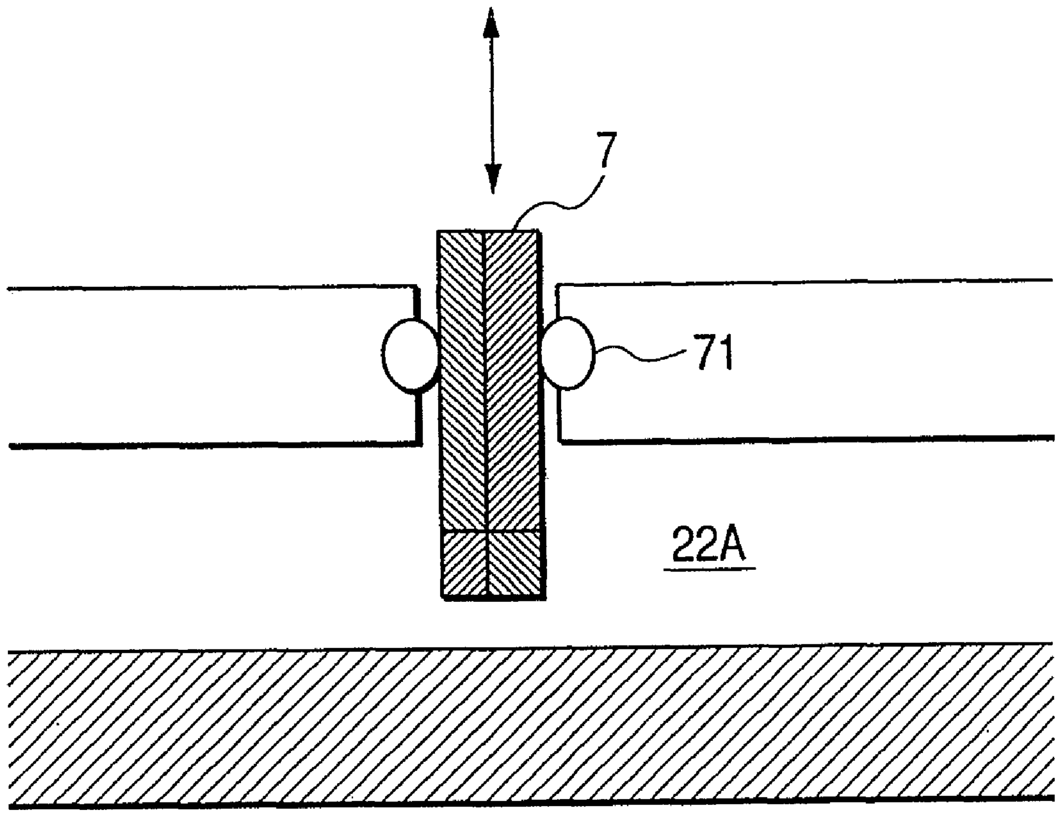
FIG. 6 is a diagram showing a structure for opening and closing a passage by a slide member.

In the above-described embodiment, the elastic member 2 is deformed to open and close the passages. However, a valve mechanism may be provided in the passage and the valve mechanism may be driven by an external force. For instance, as shown in FIG. 6, a slide member 7 may be attached to an intermediate part of passage 22A through seal member 71 and slide member 7 may be driven to open and close the passage 22A.

A method for arranging the passages and the wells is not limited to the above-described embodiment. Further, in the above-described embodiment, the passages are arranged two-dimensionally but the passage may be arranged three-dimensionally also. For instance, the elastic members may be provided on both sides of the substrate to form passages on both sides of the substrate. The passages on both sides may be connected together via through-holes formed on the substrate as required.

A sensor 9 such as a thermocouple may be provided in the cartridge to perform a feedback control based on information from sensor 9 in control section 55 (FIG. 2). The temperature of the cartridge can be accurately controlled in accordance with the feedback control.

The control member may be also used as a heater or a vibrator. Further, the well may be pressed by the control member. The control member may be provided with a sensor such as a temperature sensor. Such functions can be attached so that operating units of the cartridge may have versatility.

The cartridge for a chemical reaction and the chemical reaction processing system of the present invention are not limited to the above-described embodiment. The present invention is widely applied to the cartridge for a chemical reaction for feeding solution in an inner part in accordance with a deformation when an external force is applied on the cartridge and the system for handling such a cartridge.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A chemical reaction processing system which handles a cartridge for a chemical reaction, wherein the cartridge includes a plurality of passages formed in an inner part of the cartridge, a plurality of junctions, each of the junctions connecting at least two of the plurality of passages, a well at each junction, the chemical reaction processing system comprising:

a first actuator for applying a first external force to the cartridge so as to independently switch each of the plurality of passages between an opened state and a closed state respectively;

a second actuator for applying a second external force to the cartridge so that the liquid in each of the wells is independently pushed out of the well through the passages connected to the respective well;

a storing section for storing operation procedures of the first actuator and the second actuator; and an actuator control section for independently operating the first actuator and the second actuator in accordance with the stored operation procedures, wherein the passages are connected with each other in the inner part of the cartridge, and the chemical reaction is caused in the cartridge by feeding liquid in the inner part of the cartridge by deformation when the first and the second external forces are applied.

2. The chemical reaction processing system according to claim 1, wherein the cartridge further comprises:

a plurality of junctions, each of said junctions connecting at least two of the plurality of passages.

3. The chemical reaction processing system according to claim 2, wherein the cartridge further comprises:

a well provided at each junction.

4. The chemical reaction processing system according to claim 3, wherein the cartridge further comprises:

means for independently feeding liquid in each of the wells into the respective passages connected to the each of the wells.

5. The chemical reaction processing system according to claim 1, wherein the cartridge further comprises:

an introducing passage for introducing a sample into the inner part of the cartridge from an outside of the cartridge.

6. The chemical reaction processing system according to claim 1, wherein the cartridge further comprises:

a discharge passage for discharging the liquid to an outside of the cartridge by the external force.

7. The chemical reaction processing system according to claim 1, further comprising:

a detecting section for detecting a state of the cartridge, incorporated in the cartridge; and a state control section, external to the cartridge, for controlling the actuator control section in accordance with a result of the detection by the detecting section.

8. The chemical reaction processing system according to claim 1, wherein the cartridge is formed from materials that can be incinerated.

9. The chemical reaction processing system of claim 1, wherein:

the cartridge is sealed.

10. The chemical reaction processing system of claim 1, wherein the cartridge comprises at least four wells, wherein:

the plurality of wells comprises at least four wells disposed in an evenly spaced grid.

11. The chemical reaction processing system of claim 1, further comprising:

a plurality of well control members; and a third actuator for applying a third external force to the plurality of well control members so as to independently control the state of each of the plurality of wells.

12. The chemical processing system of claim 11, wherein:

the plurality of well control members are arranged in a matrix form.

* * * * *